(12) United States Patent
Jiang (10) Patent No.: US 11,761,296 B2
(45) Date of Patent: Sep. 19, 2023

(54) DOWNHOLE TOOLS COMPRISING DEGRADABLE COMPONENTS

(71) Applicant: Wenhui Jiang, Pearland, TX (US)

(72) Inventor: Wenhui Jiang, Pearland, TX (US)

( * ) Notice: Subject to any disclaimer, the term of this patent is extended or adjusted under 35 U.S.C. 154(b) by 200 days.

(21) Appl. No.: 17/185,563

(22) Filed: Feb. 25, 2021

(65) Prior Publication Data

US 2022/0268119 A1  Aug. 25, 2022

(51) Int. Cl.
| | |
|---|---|
| *E21B 33/134* | (2006.01) |
| *E21B 29/02* | (2006.01) |
| *C08K 3/14* | (2006.01) |
| *C22C 21/00* | (2006.01) |
| *C22C 1/10* | (2023.01) |
| *C22C 1/02* | (2006.01) |

(52) U.S. Cl.
CPC ............. *E21B 33/134* (2013.01); *C08K 3/14* (2013.01); *C22C 1/026* (2013.01); *C22C 1/1068* (2013.01); *C22C 21/00* (2013.01); *E21B 29/02* (2013.01); *C08K 2201/018* (2013.01); *E21B 2200/08* (2020.05)

(58) Field of Classification Search
CPC .... E21B 33/134; E21B 29/02; E21B 2200/08; C08K 3/14; C08K 2201/018; C22C 1/026; C22C 1/1068; C22C 1/00
See application file for complete search history.

(56) References Cited

U.S. PATENT DOCUMENTS

| | | |
|---|---|---|
| 4,175,954 A | 11/1979 | Oden et al. |
| 4,184,852 A | 1/1980 | Russ |
| 8,211,248 B2 | 7/2012 | Marya |
| 9,528,343 B2 | 12/2016 | Jordan et al. |
| 9,903,010 B2 | 2/2018 | Doud et al. |
| 9,925,589 B2 | 3/2018 | Xu |
| 10,059,092 B2 | 8/2018 | Welch et al. |

(Continued)

OTHER PUBLICATIONS

H.L. Li, S.B. Li, X.D. Chen, Y. Zhou; Spontaneous Pulverisation of Al4C3 Containing MAX Bulk Ceramics at Room Temperature; Advanced in Applied Ceramics, Dec. 19, 2013; 184-188; 113-3; Maney, Leeds, England.

(Continued)

*Primary Examiner* — Christopher J Sebesta (57) ABSTRACT

A component of a downhole tool utilized in oil and natural gas exploration and production comprises inorganic hydrolysable compound-containing materials. The inorganic hydrolysable compounds grant the component the degradability/dissolution in aqueous environment. The inorganic hydrolysable compounds include, but not are limited to, hydrolysable carbides, nitrides, and sulfides, such as aluminum carbide ($Al_4C_3$), calcium carbide ($CaC_2$), magnesium carbide ($Mg_2C_3$ or $MgCl_2$), manganese carbide ($Mn_3C$), aluminum nitride (AlN), calcium nitride ($Ca_3N_2$), magnesium nitride ($Mg_3N_2$), aluminum sulfide ($Al_2S_3$), aluminum magnesium carbide ($Al_2MgCl_2$), and aluminum zinc carbide ($Al_4Zn_2C_3$).

16 Claims, 3 Drawing Sheets

(56) References Cited

U.S. PATENT DOCUMENTS

| | | | |
|---|---|---|---|
| 10,240,022 | B2 | 3/2019 | Roy et al. |
| 10,316,601 | B2 | 6/2019 | Walton et al. |
| 10,316,616 | B2 | 6/2019 | Stafford et al. |
| 10,329,653 | B2 | 6/2019 | Doud et al. |
| 10,364,629 | B2 | 7/2019 | Jacob et al. |
| 10,472,909 | B2 | 11/2019 | Xu et al. |
| 10,526,868 | B2 | 1/2020 | Walton et al. |
| 10,544,304 | B2 | 1/2020 | Sherman et al. |
| 10,544,645 | B2 | 1/2020 | Xu |
| 10,633,974 | B2 | 4/2020 | Fripp et al. |
| 10,655,411 | B2 | 5/2020 | Fripp et al. |
| 10,737,321 | B2 | 8/2020 | Xu |
| 10,760,151 | B2 | 9/2020 | Doud et al. |
| 10,865,465 | B2 | 12/2020 | Sherman et al. |
| 10,888,926 | B2 | 1/2021 | Roy et al. |
| 2014/0262327 | A1* | 9/2014 | Xu .................... C22C 33/02 166/376 |
| 2015/0159462 | A1* | 6/2015 | Cutler .................. E21B 43/261 166/377 |
| 2016/0230494 | A1* | 8/2016 | Fripp ................... E21B 41/00 |
| 2017/0073797 | A1 | 3/2017 | Otsuka et al. |
| 2018/0016662 | A1 | 1/2018 | Qin et al. |
| 2018/0086894 | A1 | 3/2018 | Roy et al. |
| 2018/0238133 | A1* | 8/2018 | Fripp ..................... E21B 23/01 |
| 2018/0252070 | A1 | 9/2018 | Zhu et al. |
| 2018/0265682 | A1 | 9/2018 | Roy et al. |
| 2018/0283129 | A1 | 10/2018 | Roy |
| 2019/0144753 | A1 | 5/2019 | Fripp et al. |
| 2019/0186248 | A1* | 6/2019 | Sherman ................. C09K 8/68 |
| 2019/0271061 | A1 | 9/2019 | Tang et al. |
| 2020/0318456 | A1 | 10/2020 | Kovalchuk et al. |
| 2020/0407822 | A1 | 12/2020 | Sherman et al. |

OTHER PUBLICATIONS

F. Binczyk, S.J. Skrzypek; Intermetallic Powders of Ni—Al, Cu—Al and Cr—Al Systems Obtained By the Self-Disintergration Method; Powder Technology, Oct. 22, 2001; 159-163; 120-1; Elsevier, Amsterdam, Netherland.

Yufei Lu, et al.; Aluminum Carbide Hydrolysis Induced Degradation of Thermal Conductivity and Tensile Strength in Diamond/Aluminum Composites; Journal of Composite Materials, Feb. 7, 2018; 2709-2717; 52-20; SAGE Publishing, Thousand Oaks, USA.

Kristoffer Krnel, et al.; Degradation of AlN Powder in Aqueous Environment; Journal of Materials Research, Apr. 1, 2004; 1157-1163; 19-4; Springer Publishing, New York, USA.

\* cited by examiner

DOWNHOLE TOOLS COMPRISING DEGRADABLE COMPONENTS

CROSS-REFERENCE TO RELATED APPLICATION

This application claims the benefit of U.S. Provisional Patent Application Ser. No. 62/992,591, filed on Mar. 20, 2020, titled "Dissolvable Materials, Methods of Their Fabrications, and Applications", and U.S. Provisional Patent Application Ser. No. 63/091,040, filed on Oct. 13, 2020, titled "Downhole Tools Comprising Degradable Components", the disclosures of which are incorporated herein in their entireties by reference.

BACKGROUND OF THE INVENTION—PRIOR ART

The following is a tabulation of some prior arts that presently appear relevant:

U. S. Patents

| Pat. No. | Kind Code | Issue Date | Patentee |
|---|---|---|---|
| 4,175,954 | — | 1979 Nov. 27 | Oden, et al. |
| 4,184,852 | — | 1980 Jan. 22 | Russ |
| 8,211,248 | B2 | 2012 Jul. 3 | Marya |
| 9,528,343 | B2 | 2016 Dec. 27 | Jordan, et al. |
| 9,903,010 | B2 | 2018 Feb. 27 | Doud, et al. |
| 9,925,589 | B2 | 2018 Mar. 27 | Xu |
| 10/059,092 | B2 | 2018 Aug. 28 | Welch, et al. |
| 10/240,022 | B2 | 2019 Mar. 26 | Roy, et al. |
| 10/316,601 | B2 | 2019 Jun. 11 | Walton, et al. |
| 10/316,616 | B2 | 2019 Jun. 11 | Stafford, et al. |
| 10/329,653 | B2 | 2019 Jun. 25 | Doud, et al. |
| 10/364,629 | B2 | 2019 Jul. 30 | Jacob, et al. |
| 10/472,909 | B2 | 2019 Nov. 12 | Xu, et al. |
| 10/526,868 | B2 | 2020 Jan. 7 | Walton, et al. |
| 10/544,304 | B2 | 2020 Jan. 28 | Sherman, et al. |
| 10/544,645 | B2 | 2020 Jan. 28 | Xu |
| 10/633,974 | B2 | 2020 Apr. 28 | Fripp, et al. |
| 10/655,411 | B2 | 2020 May 19 | Fripp, et al. |
| 10/737,321 | B2 | 2020 Aug. 11 | Xu |
| 10/760,151 | B2 | 2020 Sep. 1 | Doud, et al. |
| 10/865,465 | B2 | 2020 Dec. 15 | Sherman, et al. |
| 10/888,926 | B2 | 2021 Jan. 12 | Roy, et al. |

U. S. patent application Publications

| Publication Nr. | Kind Code | Publication Date | Applicant |
|---|---|---|---|
| 20170073797 | A1 | 2017 Mar. 16 | Otsuka, et al. |
| 20180016662 | A1 | 2018 Jan. 8 | Qin, et al. |
| 20180086894 | A1 | 2018 Mar. 29 | Roy, et al. |
| 20180252070 | A1 | 2018 Sep. 6 | Zhu, et al. |
| 20180265682 | A1 | 2018 Sep 20 | Roy, et al. |
| 20180283129 | A1 | 2018 Oct. 4 | Roy |
| 20190144753 | A1 | 2019 May 16 | Fripp, et al. |
| 20190271061 | A1 | 2019 Sep. 5 | Tang, et al. |
| 20200318456 | A1 | 2020 Oct. 8 | Kovalchuk, et al. |
| 20200407822 | A1 | 2020 Dec. 31 | Sherman, et al. |

BACKGROUND OF THE INVENTION

The present disclosure is related to downhole tools utilized in oil and natural gas exploration and production, more particularly, to the downhole tools comprising at least one component comprised of an inorganic hydrolysable compound-containing material.

In oil and natural gas exploration and production, various downhole tools are used to build and develop a wellbore, so as to extract hydrocarbon resource such as petroleum and natural gas from subterranean formation. A downhole tool may consist of various components. The components are made from various materials, so as to realize their functions, such as metals and alloys, ceramics, polymers, carbon materials, as well as their composites. Some of the components need prolonged service lives, while the others may require limited service lives only.

In oil and natural gas exploration and production such as hydraulic fracking, some downhole tools or components are utilized that are only required to have limited service lives. After a downhole tool or component service function is complete, it must be removed or disposed of to recover the original size of fluid pathway for use, including hydrocarbon production, etc. Disposal of a downhole tools or component has conventionally been done by milling or drilling the downhole tool or component out of the wellbore. This is time consuming and expensive operations. In order to eliminate the need for milling or drilling operations, the removal of tools or components from a wellbore by degradation/dissolution of degradable/dissolvable materials has been proposed. While these materials are useful, it is also very desirable that these materials have a good combination of mechanical strength and degradability/dissolvability in aqueous environment. Commercial products of degradable/dissolvable materials for a downhole tool or component include aluminum alloys, magnesium alloys, polymers, and their composites. The further improvement of the degradable/dissolvable materials to increase their mechanical strength, degradability/dissolvability, and manufacturability is very desirable.

SUMMARY OF THE INVENTION

The present disclosure relates to a downhole tool utilized in oil and natural gas exploration and production, more particularly, to a downhole tool comprising at least one component comprised of an inorganic hydrolysable compound-containing material. The component comprised of the inorganic hydrolysable compound-containing material is degradable/dissolvable, and it is designed for limited service lives. The component comprised of the inorganic hydrolysable compound-containing material degrades/dissolves substantially in aqueous environment such as fresh water, water-containing solution, or moist air within a wellbore and loses its integrity, when it completes its designed functions.

The present disclosure also relates to a method comprising: introducing a downhole tool into a subterranean formation. The downhole tool comprises at least one component comprising an inorganic hydrolysable compound-containing material.

The present disclosure also relates to a system comprising: a tool string connected to a derrick and extending through a surface into a wellbore in a subterranean formation; and a downhole tool connected to the tool string and placed in the wellbore. The downhole tool comprises at least one component comprising an inorganic hydrolysable compound-containing material.

The downhole tool includes at least one degradable/dissolvable component comprised of inorganic hydrolysable compounds-containing materials. The downhole tool may be, but is not limited to, a wellbore isolation device, a perforation tool, a cementing tool, a completion tool, a drilling tool, a testing tool, a slickline tool, a wireline tool, an autonomous tool, a tubing conveyed perforating tool, and any combination thereof.

The degradable/dissolvable component comprised of inorganic hydrolysable compound-containing materials includes, but is not limited to, the mandrel of a packer or plug, a spacer ring, a slip, a wedge, a retaining ring, an extrusion limiter or backup shoe, a mule shoe, a ball, a ball seat, a flapper, a sleeve, a perforation gun housing, a cement dart, a wiper dart, a sealing element, a slip block, a logging tool, a housing, a release mechanism, a pump down tool, an inflow control device plug, an autonomous inflow control device plug, a coupling, a connector, a support, an enclosure, a cage, a slip body, a tapered shoe, or any other components therefor. The component also includes a temporary blocking plug which is used in an operation of a fracture, or a perforation, or in a wellbore for well treatment.

The inorganic hydrolysable compounds include, but not are limited to, hydrolysable carbides, nitrides, sulfide, etc., such as aluminum carbide ($Al_4C_3$), calcium carbide ($CaC_2$), magnesium carbide ($Mg_2C_3$ or $MgC_2$), manganese carbide ($Mn_3C$), aluminum nitride (AlN), calcium nitride ($Ca_3N_2$), magnesium nitride ($Mg_3N_2$), aluminum sulfide ($Al_2S_3$), aluminum magnesium carbide ($Al_2MgC_2$), and aluminum zinc carbide ($Al_4Zn_2C_3$). The inorganic hydrolysable compounds may be binary, ternary, or multicomponent.

The inorganic hydrolysable compound-containing materials are metal-based materials comprising inorganic hydrolysable compounds and metallic matrix. The metallic matrix is a metal or alloy selected from the group consisting of aluminum and its alloys, magnesium and its alloys, zinc and its alloys, copper and its alloys, titanium and its alloys, zirconium and its alloys, nickel and its alloys, cobalt and its alloys, and iron and its alloys including steels. The metal-based materials comprise no more than 50 wt. % (weight percentage) of the inorganic hydrolysable compounds.

The inorganic hydrolysable compound-containing materials are ceramic-based materials comprising inorganic hydrolysable compounds and ceramic matrix. The ceramic matrix is selected from the group consisting of carbides, nitrides, borides, silicides, oxides, and any combination thereof. The ceramic-based materials comprise no more than 50 wt. % of the inorganic hydrolysable compounds.

The inorganic hydrolysable compound-containing materials are polymer-based materials comprising inorganic hydrolysable compounds and polymer matrix. The polymer matrix is selected from the group consisting of thermoset plastics, thermoplastic polymers, elastomers including rubbers, and any combination thereof. The polymer-based materials comprise no more than 50 wt. % of the inorganic hydrolysable compounds.

The inorganic hydrolysable compound-containing materials are carbon-based materials comprising inorganic hydrolysable compounds and carbon matrix. The carbon matrix is selected from the group consisting of carbon and its composites. The carbon is selected from the group consisting of expanded graphite, expandable graphite, natural graphite, synthetic graphite, and any combination thereof. The composites comprise a carbon matrix and second phases-reinforcements. The reinforcements are selected from the group consisting of metals, alloys, carbon, ceramics, or any combination thereof. The carbon-based materials comprise no more than 50 wt. % of the inorganic hydrolysable compounds.

The inorganic hydrolysable compound-containing materials are inorganic hydrolysable compound-based materials. The inorganic hydrolysable compound-based materials comprise at least 50 wt. % of inorganic hydrolysable compounds. The inorganic hydrolysable compound-based materials may have inorganic hydrolysable compounds as exclusive constituents. The inorganic hydrolysable compound-based material may also comprise other constituents besides the inorganic hydrolysable compounds. The other constituents are selected from the group consisting of metals, alloys, ceramics, polymers, carbon, and their composites.

The inorganic hydrolysable compound-containing materials are gradient-distributed, inorganic hydrolysable compound-containing materials. The materials comprise inorganic hydrolysable compounds and a matrix. The inorganic hydrolysable compounds have a gradient distribution including a layered distribution in the matrix. The matrix is selected from the group consisting of metals, alloys, ceramics, polymers, carbon, and their composites.

The degradable/dissolvable component comprised of the inorganic hydrolysable compound-containing materials has a coating. The coating has a degradation/dissolution rate in water or water-containing solutions different from that of the inorganic hydrolysable compound-containing materials. The coating is selected from the group consisting of metals, alloys, ceramics, polymers, carbon, and their composites.

The fabrication methods of the inorganic hydrolysable compound-containing materials for the degradable/dissolvable component are selected from the group consisting of ball milling, powder metallurgy, sintering, mixing, infiltration, melting, casting, deposition, heat treatment, wrought processing, and any combination thereof. In these fabrication methods, inorganic hydrolysable compounds form either ex-situ, in-situ, or in their combination. The ex-situ formation is that the inorganic hydrolysable compounds act as one of starting materials and are dispersed into a matrix and/or bonded by the matrix or a binder material. The in-situ formation is that inorganic hydrolysable compounds form via a chemical reaction in a matrix during fabrication.

DRAWINGS—REFERENCE NUMERALS 100 well system
110 downhole tool
120 tool string
130 wellbore
140 subterranean formation
150 derrick
160 rig floor
170 earth's surface
200 frac plug
210 body
220 slip
230 mechanical slip body 240 seal
250 taped shoe
260 ball
270 cage
280 flowbore
300 dissolvable component made of inorganic hydrolysable compound-containing material i.e., a composite material composed of inorganic hydrolysable compound and a binder material as its constituents
310 inorganic hydrolysable compound particles
320 binger material

DESCRIPTION OF THE INVENTION

The present disclosure relates to a downhole tool utilized in oil and natural gas exploration and production, more particularly, to a downhole tool comprising at least one degradable/dissolvable component comprised of an inorganic hydrolysable compound-containing material. The degradable/dissolvable component comprised of the inorganic hydrolysable compound-containing material is designed for limited service lives. It degrades/dissolves substantially in aqueous environment of a wellbore and lose their integrity when it completes their designed functions.

Embodiments of the disclosure also relates to a method comprising: introducing a downhole tool into a subterranean formation. The downhole tool comprises at least one component comprised of an inorganic hydrolysable compound-containing material.

Embodiments of the disclosure also relates to a system comprising: a tool string connected to a derrick and extending through a surface into a wellbore in a subterranean formation; and a downhole tool connected to the tool string and placed in the wellbore. The downhole tool comprises at least one component comprised of an inorganic hydrolysable compound-containing material.

In oil and natural gas exploration and production, a downhole tool is referred as to a tool used in developing and building a wellbore in subterraneous formation. Various downhole tools are developed for performing various functions. Some downhole tools or their components need to be retrieved from a wellbore when they complete their functions, so as to leave a path for subsequent operations or production fluid flow. For example, in hydraulic fracking, after a downhole tool or component service function is complete, it must be removed or disposed of in order to recover the original size of fluid pathway for use, including hydrocarbon production, etc. Disposal of the downhole tool or component has conventionally been done by milling or drilling the downhole tool or component out of the wellbore. This is time consuming and expensive operations. In order to eliminate the need for milling or drilling operations, the removal of a downhole tool or component from the wellbore by degradation/dissolution of degradable/dissolvable materials has been proposed.

In some embodiments, the downhole tool described herein includes at least one degradable/dissolvable component comprised of inorganic hydrolysable compound-containing materials. The downhole tool is used for various downhole operations. The downhole operations may include, but are not limited to, a drilling operation, a completion operation, a remedial operation, a stimulation operation, an acidizing operation, an acid-fracturing operation, a frac-packing operation, a perforating operation, a near-wellbore consolidation operation, a sand control operation, and any combination thereof.

In some embodiments, the downhole tool described herein includes at least one degradable/dissolvable component comprised of inorganic hydrolysable compound-containing materials. The downhole tool may be, but is not limited to, a wellbore isolation device, a perforation tool, a cementing tool, a completion tool, a drilling tool, a testing tool, a slickline tool, a wireline tool, an autonomous tool, a tubing conveyed perforating tool, and any combination thereof. The downhole tool may have one or more components comprised of inorganic hydrolysable compound-containing materials. The components include, but are not limited to, the mandrel of a packer or plug, a spacer ring, a slip, a wedge, a retaining ring, an extrusion limiter or backup shoe, a mule shoe, a ball, a ball seat, a flapper, a sleeve, a perforation gun housing, a cement dart, a wiper dart, a sealing element, a slip block, a logging tool, a housing, a release mechanism, a pump down tool, an inflow control device plug, an autonomous inflow control device plug, a coupling, a connector, a support, an enclosure, a cage, a slip body, a tapered shoe, or any other components.

In some embodiments, the downhole tool described herein includes at least one degradable/dissolvable component comprised of inorganic hydrolysable compound-containing materials. The downhole tool may be any type of wellbore isolation device capable of fluidly sealing two sections of the wellbore from one another and maintaining differential pressure. That is, the wellbore isolation device is used to isolate one pressure zone from another. The wellbore isolation device may be used in direct contact with the formation face of the wellbore, with casing string, with a screen or wire mesh, and the like. The wellbore isolation device may include, but is not limited to, a frac plug, a frac ball, a setting ball, a bridge plug, a wellbore packer, a wiper plug, a cement plug, a basepipe plug, a sand screen plug, an inflow control device plug, a tubing section, a tubing string, and any other wellbore isolation device therefor.

In some embodiments, the downhole tool described herein includes at least one degradable/dissolvable component comprised of inorganic hydrolysable compound-containing materials. The component is a temporary blocking plug in a fracture, a perforation, or a wellbore, when in a well penetrating a subterranean formation, and/or performing a downhole operation are provided. The temporary blocking plug may be in the form of a temporary blocking agent or ball. It is dispersed in a slurry. The slurry is injected into a well, allowing the temporary blocking agent or ball to form a plug in a fracture, a perforation, or a wellbore, for assisting diversion or isolation of fluids in the well. In fact, it is used during the downhole operation of well treatment.

Figure 1:
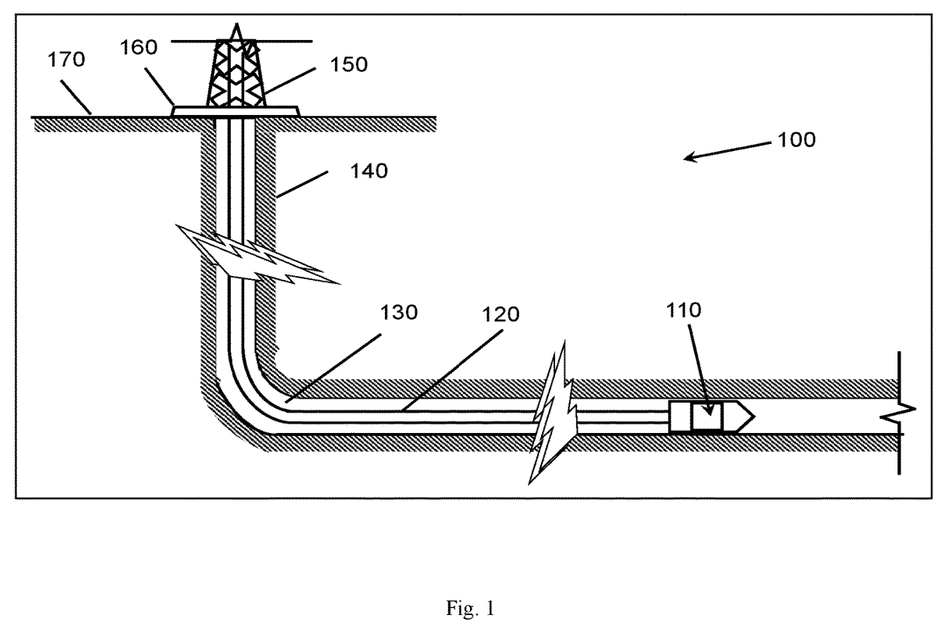
FIG. 1 is a schematic illustration of a well system that employs one or more principles of the present disclosure, according to one or more embodiments.

FIG. 1 schematically illustrates an exemplary well system 100 for a downhole tool 110. As depicted, a derrick 150 with a rig floor 160 is positioned on the earth's surface 170. A wellbore 130 is positioned below the derrick 150 and the rig floor 160 and extends into subterranean formation 140. A tool string 120 extends from the derrick 150 and the rig floor 160 downwardly into the wellbore 130. The tool string 120 may be any mechanical connection to the surface, such as wireline, slick line, drill pipe, or coiling tubing. The tool string 120 suspends the downhole tool 110 for placement into the wellbore 130 at a desired location to perform a specific downhole operation. Examples of such the downhole operations may include, but are not limited to, a stimulation operation, an acidizing operation, a fracturing operation, a frac packing operation, a remedial operation, a perforating operation, a near-wellbore consolidation operation, a drilling operation, a completion operation, and any combination thereof.

In some embodiments, the downhole tool 110 may comprise one or more components made of an inorganic hydrolysable compound-containing material. That is, at least one portion of the downhole tool 110 may be composed of an inorganic hydrolysable compound-containing material. The downhole tool 110 may be any type of wellbore isolation device capable of fluidly sealing two sections of the wellbore 130 from one another and maintaining differential pressure. Examples of suitable wellbore isolation device may include, but are not limited to a frac plug, a frac ball, a setting ball, a bridge plug, a wellbore packer, a wiper packer, a wiper plug, a cement plug, a basepipe plug, a sand screen plug, an inflow control device, an autonomous inflow control device plug, a tubing section, a tubing string, and any combination thereof.

In some embodiments, the downhole tool 110 may be a wellbore isolation device, a perforation tool, a cementing tool, or a combination tool. The downhole tool 110 may be a drilling tool, a testing tool, a slickline tool, a wireline tool, an autonomous tool, a tubing conveyed perforating tool, and any combination thereof. The downhole tool 110 may have one or more components made of the inorganic hydrolysable compound-containing material including, but not limited to, the mandrel of a packer or plug, a spacer ring, a slip, a wedge, a retaining ring, an extension limiter or a backup shoe, a mule shoe, a ball, a flapper, a ball seat, a sleeve, a perforation gun housing, a cement dart, a wiper dart, a sealing element, a wedge, a slip block, a logging tool, a housing, a release mechanism, a pumpdown tool, an inflow control device plug, an autonomous inflow control device plug, a coupling, a connector, a support, an enclosure, a cage, a slip body, a tapered shoe, or any other downhole tool or component therefor.

The well system 100 as shown in FIG. 1 is just an example of a wide variety of well systems in which the principal of the present disclosure may be utilized. Therefore, the principle of this disclosure is not necessarily limited to any of the details of the depicted well system or various downhole tools or components thereof, depicted in the drawing or otherwise described herein. For example, it is not necessary in keeping with the principle of this disclosure for the wellbore 130 to include a horizontal section. The well system 100 may be equally employed in vertical and/or deviated wellbores, without departing from the scope of the present disclosure. Furthermore, it is not necessary for a single downhole tool 110 to be suspended from the tool string 120.

In addition, it is not necessary for the downhole tool 110 to be lowered into wellbore 130 using the derrick 150. Rather, any other type of device suitable for lowering the downhole tool 110 into the wellbore 130 for placement at a desired location, or use therein to perform a downhole operation may be utilized without departing from the scope of the present disclosure. Although not depicted, the downhole tool 110 may alternatively be hydraulically pumped into the wellbore 130 and thus, not need the tool string 120 for delivery into the wellbore 130.

Figure 2:
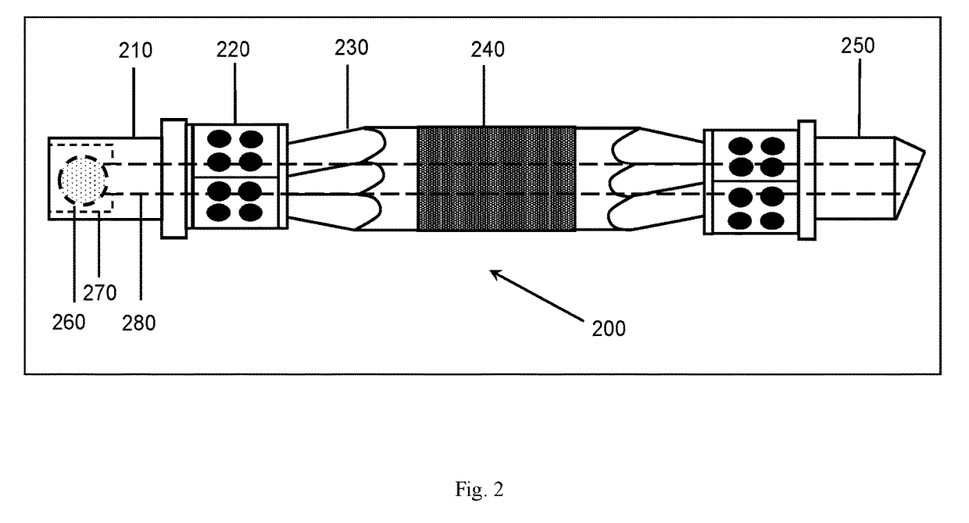
FIG. 2 is a schematic illustration of an exemplary downhole tool-frac plug that employs one or more principles of the present disclosure, according to one or more embodiments.

Referring to FIG. 2, with continued reference to FIG. 1, one specific type of downhole tool 110 described herein is a frac plug 200, which is a wellbore isolation device used during a well stimulation/fracturing operation. FIG. 2 illustrates an exemplary frac plug 200 being lowered into a wellbore 130 on a tool string 120. The frac plug 200 generally comprises a body 210, slips 220 and a sealing element 240.

The body 210 of the frac plug 200 comprises an axial flowbore 280 extending therethrough. A cage 270 is formed at the upper end of the body 210 for retaining a ball 260 that acts as a one-way check valve. In particular, the ball 210 seals off the flowbore 280 to prevent flow downwardly therethrough, but permits flow upwardly through the flowbore 280. One or more slips 220 are mounted around the body 210 below the sealing element 240. The slips 220 are guided by a mechanical slip body 230. A taped shoe 250 is provided at the lower end of the body 210 for guiding and protecting the frac plug 200 as it is lowered into the wellbore 130.

At least one of a body 210, slips 220, and a sealing element 240 may be composed at least partially of an inorganic hydrolysable compound-containing material. Moreover, components of one or more of a body 210, slips 220, and a sealing element 240 may be composed of one or more of the inorganic hydrolysable compound-containing materials. For example, one or more of the ball 260, the cage 270, the mechanical slip body 230, or the taped shoe 250 may be formed from the same or different type of the inorganic hydrolysable compound-containing materials, without departing from the scope of the present disclosure. Moreover, although components of a downhole tool 110 (FIG. 1) are explained herein with reference to a frac plug 200, other downhole tools and components thereof may be formed from an inorganic hydrolysable compound-containing material without departing from the scope of the present disclosure.

Inorganic hydrolysable compounds are a kind of inorganic compounds which can react with water in aqueous environment. Their hydrolysis reactions would generate gaseous reaction products and even solid products with a significant volume expansion. Such characteristic features of the hydrolysis reactions would lead to disintegrating of a material or structure, i.e., substantial cracking and even pulverizing. As a result, the material or structure would lose its integrity. This is a degradation mechanism of the inorganic hydrolysable compound-containing materials utilized in the present disclosure. The inorganic hydrolysable compound constituents in the materials would hydrolyze/dissolve and cause the degradation of the materials or structures, while other constituents may not be able to dissolve and are just subject to mechanical damages caused by the hydrolysis of the inorganic hydrolysable compound constituents. This degradation mechanism is different from the dissolution mechanisms of commercial dissolvable materials such as Al alloys, Mg alloys, and polymers such as polyglycolic acid (PGA) wherein the materials get corroded or hydrolyzed. The present invention is conceived based on such degradation mechanism. Throughout this specification, the terms "degradation" and "dissolution" and their variants refer to disintegration of a material or structure including cracking, pulverizing, and dissolving. The inorganic hydrolysable compounds are ideal constituents for degradable/dissolvable components of a downhole tool and component with a limited service life.

In some embodiments, the downhole tool described herein includes one or more degradable/dissolvable components comprised of inorganic hydrolysable compound-containing materials. The inorganic hydrolysable compounds include, but are not limited to, hydrolysable carbides, borides, nitrides, sulfides, etc., such as aluminum carbide ($Al_4C_3$), calcium carbide ($CaC_2$), magnesium carbide ($Mg_2C_3$ or $MgC_2$), manganese carbide ($Mn_3C$), aluminum nitride (AlN), calcium nitride ($Ca_3N_2$), magnesium nitride ($Mg_3N_2$), aluminum sulfide ($Al_2S_3$), and aluminum magnesium carbide ($Al_2MgCl_2$), etc. The inorganic hydrolysable compounds may be binary, ternary, or even multicomponent.

In some embodiments, the downhole tool described herein includes one or more degradable/dissolvable components comprised of inorganic hydrolysable compound-containing materials. The inorganic hydrolysable compound is aluminum carbide ($Al_4C_3$). The aluminum carbide ($Al_4C_3$) may be further alloyed using some alloying elements to form a complex carbide. That is, the complex carbide comprises other elements besides aluminum (Al) and carbon (C). For example, the aluminum carbide ($Al_4C_3$) is alloyed with zinc (Zn) and magnesium (Mg) to form complex carbides-aluminum zinc carbide ($Al_4Zn_2C_3$) and aluminum magnesium carbide ($Al_2MgC_2$), respectively. Such complex carbides are still hydrolysable.

$Al_4C_3$ is a kind of binary compounds consisting of aluminum and carbon. It is chemically instable in aqueous environment such as water, water-containing solutions, or even moist air. The chemical reaction between $Al_4C_3$ and water, i.e., a hydrolysis reaction, is as below:

$$Al_4C_3 + 12H_2O \rightarrow 4Al(OH)_3 + 3CH_4$$

The reaction generates a gaseous phase $CH_4$ and a solid phase $Al(OH)_3$. The formation of the solid phase leads to more than 110% volume expansion. The volume expansion would generate compression stress and favor materials degradation/disintegration. Besides, a similar reaction occurs between $Al_4C_3$ and other protic reagents, for example, $$Al_4C_3 + 12HCl \rightarrow 4AlCl_3 + 3CH_4$$

In some embodiments, the downhole tool described herein include one or more degradable/dissolvable components comprised of inorganic hydrolysable compound-containing materials. The inorganic hydrolysable compound is aluminum nitride (AlN). The aluminum nitride (AlN) may be further alloyed using some alloying elements to form a complex nitride. That is, the complex nitride comprises other elements besides Al and N. But such complex nitride should be still hydrolysable.

AlN is a kind of binary compounds consisting of aluminum (Al) and nitrogen (N). It is chemically instable in aqueous environment such as water, water-containing solutions, or even moist air. The chemical reaction between AlN and water, i.e., a hydrolysis reaction, is as below:

$$AlN + 3H_2O \rightarrow Al(OH)_3 + NH_3$$

The reaction generates a gaseous phase $NH_3$ and a solid phase $Al(OH)_3$. The formation of the solid phase leads to more than 150% volume expansion. The volume expansion would generate compression stress and favor material degradation/disintegration.

In some embodiments, the downhole tool described herein include one or more degradable/dissolvable components comprised of inorganic hydrolysable compound-containing materials. The inorganic hydrolysable compound is magnesium nitride ($Mg_3N_2$). The magnesium nitride ($Mg_3N_2$) may be further alloyed using some alloying elements to form a complex nitride. That is, the complex nitride comprises other elements besides Mg and N. But such complex nitride should be still hydrolysable.

$Mg_3N_2$ is a kind of binary compounds consisting of magnesium (Mg) and nitrogen (N). It is chemically instable in aqueous environment such as water, water-containing solutions, or even moist air. The chemical reaction between $Mg_3N_2$ and water, i.e., a hydrolysis reaction, is as below:

$$Mg_3N_2 + 6H_2O \rightarrow 3Mg(OH)_2 + 2NH_3$$

The reaction generates a gaseous phase $NH_3$ and a solid phase $Mg(OH)_2$. The formation of the solid phase leads to more than 100% volume expansion. The volume expansion would generate compression stress and favor material degradation/disintegration.

Such instability of the inorganic hydrolysable compounds such as $Al_4C_3$, AlN, and $Mg_3N_2$ in aqueous environment makes them be good candidate constituents in a degradable/dissolvable material. Furthermore, they have a high mechanical strength and hardness. For example, $Al_4C_3$ has approximately the same hardness as topaz, a hardness of 8 on Mohs hardness scale. In fact, it is used as abrasives in a tool. All the characteristic features make the inorganic hydrolysable compounds be ideal candidate constituents in degradable/dissolvable, structural materials for a downhole tool and its components that are required to have degradability/dissolution in aqueous environment of a wellbore.

Some embodiments of the disclosure relate to the downhole tool described herein including one or more degradable/dissolvable components comprised of inorganic hydrolysable compound-containing metal-based materials. The metal-based materials comprise inorganic hydrolysable compound phase and metallic matrix. The metal-based materials comprise no more than 50 wt. % of the inorganic hydrolysable compound phase. Furthermore, the metal-based materials may comprise other second phases, i.e., reinforcements, besides inorganic hydrolysable compound phase and metallic matrix.

According to the contents of inorganic hydrolysable compounds and reinforcements, the metal-based materials can be further divided into alloys and metallic matrix composites. For the materials comprising at least 5 wt. % of the inorganic hydrolysable compounds and the reinforcements, they can be referred to as inorganic hydrolysable compound-containing metallic matrix composites. For the materials comprising no more than 5 wt. % of the inorganic hydrolysable compounds and the reinforcements, they can be referred to as inorganic hydrolysable compound-containing alloys.

Some embodiments of the disclosure relate to the downhole tool described herein including one or more degradable/dissolvable components comprised of inorganic hydrolysable compound-containing metal matrix composites. The composites comprise inorganic hydrolysable compounds and metallic matrix. Optionally, the composites comprise other second phases-reinforcements. The composite comprises at least 5 wt. % of the inorganic hydrolysable compounds and the reinforcements. The inorganic hydrolysable compounds have various shapes and sizes such as spherical, blocky, platelet-like, needle-like, etc., and in millimeters, micrometers, and even nanometers. The other second phases-reinforcements may be selected from the group consisting of C, SiC, $B_4C$, TiC, WC, $Al_2O_3$, etc. The other second phases can take various shapes such as particulates and fibers, and have various sizes from nanometers, micrometers, to millimeters. The metallic matrix is a metal or alloy selected from the group consisting of aluminum and its alloys, magnesium and its alloys, zinc and its alloys, copper and its alloys, titanium and its alloys, zirconium and its alloys, nickel and its alloys, cobalt and its alloys, and iron and its alloys including steels, etc.

Some embodiments of the disclosure relate to the downhole tool described herein including one or more degradable/dissolvable components comprised of inorganic hydrolysable compound-containing aluminum matrix composites. The composites comprise inorganic hydrolysable compounds and aluminum or its alloy matrix. Optionally, the composites comprise other second phases-reinforcements. The composites comprise at least 5 wt. % of the inorganic hydrolysable compounds and the reinforcements. The inorganic hydrolysable compounds have various shapes and sizes such as spherical, blocky, platelet-like, needle-like, etc., and in millimeters, micrometers, and even nanometers. The other second phases-reinforcements may be selected from the group consisting of C, SiC, $B_4C$, TiC, WC, $Al_2O_3$, etc. The other second phases can take various shapes such as particulates and fibers, and have various sizes from nanometers, micrometers, to millimeters. Furthermore, the aluminum alloy matrix may contain one or more of low-melting-point elements selected from the group consisting of gallium (Ga), tin (Sn), indium (In), etc.

Some embodiments of the disclosure relate to the downhole tool described herein including one or more degradable/dissolvable components comprised of inorganic hydrolysable compound-containing magnesium matrix composites. The composites comprise inorganic hydrolysable compounds and magnesium alloy matrix. Optionally, the composites comprise other second phases-reinforcements. The composite comprises at least 5 wt. % of the inorganic hydrolysable compounds and the reinforcements. The inorganic hydrolysable compounds have various shapes and sizes such as spherical, blocky, platelet-like, needle-like, etc., and in millimeters, micrometers, and even nanometers. The other second phases-reinforcements may be selected from the group consisting of C, SiC, $B_4C$, TiC, WC, $Al_2O_3$, etc. The other second phases can take various shapes such as particulates and fibers, and various sizes from nanometers, micrometers, to millimeters.

Some embodiments of the disclosure relate to the downhole tools described herein including one or more degradable/dissolvable components comprised of inorganic hydrolysable compound-containing alloys. The alloys comprise inorganic hydrolysable compounds and metallic matrix. Optionally, the alloys comprise other second phases-reinforcements. The alloys comprise no more than 5 wt. % of the inorganic hydrolysable compounds and the reinforcements. The inorganic hydrolysable compounds have various shapes and sizes such as spherical, blocky, platelet-like, needle-like, etc., and in millimeters, micrometers, and even nanometers. The other second phases-reinforcements may be selected from the group consisting of C, SiC, $B_4C$, TiC, WC, $Al_2O_3$, etc. The other second phases can take various shapes such as particulates and fibers, and various sizes from nanometers, micrometers, to millimeters. The metallic matrix is selected from the group consisting of aluminum and its alloys, magnesium and its alloys, zinc and its alloys, copper and its alloys, titanium and its alloys, zirconium and its alloys, nickel and its alloys, cobalt and its alloys, and iron and its alloys including steels, etc. Compared with the inorganic hydrolysable compound-containing metallic matrix composites, the inorganic hydrolysable compound-containing alloys have a lower content of the inorganic hydrolysable compounds and the other second phase-reinforcements.

Some embodiments of the disclosure relate to the downhole tool described herein including one or more degradable/dissolvable components comprised of inorganic hydrolysable compound-containing aluminum alloys. The alloys comprise inorganic hydrolysable compounds and aluminum alloy matrix. Optionally, the alloys comprise other second phases-reinforcements. The alloys comprise no more than 5 wt. % of the inorganic hydrolysable compounds and the reinforcements. The inorganic hydrolysable compounds have various shapes and sizes such as spherical, blocky, platelet-like, needle-like, etc., and in millimeters, micrometers, and even nanometers. The other second phases-reinforcements may be selected from the group consisting of C, SiC, $B_4C$, TiC, WC, $Al_2O_3$, etc. The other second phases can take various shapes such as particulates and fibers, and various sizes from nanometers, micrometers, to millimeters. The aluminum alloy matrix is either pure aluminum or aluminum alloys. The aluminum alloys may contain one or more alloying elements selected from the group consisting of silicon (Si), magnesium (Mg), copper (Cu), zinc (Zn), manganese (Mn), titanium (Ti), zirconium (Zr), lithium (Li), nitrogen (N), boron (B), carbon (C), gallium (Ga), tin (Sn), indium (In), etc.

Some embodiments of the disclosure relate to the downhole tool described herein including one or more degradable/dissolvable components comprised of inorganic hydrolysable compound-containing magnesium alloys. The alloys comprise inorganic hydrolysable compounds and magnesium alloy matrix. Optionally, the alloys comprise other second phases-reinforcements. The alloys comprise no more than 5 wt. % of the inorganic hydrolysable compounds and the reinforcements. The inorganic hydrolysable compounds have various shapes and sizes such as spherical, blocky, platelet-like, needle, etc., and in millimeters, micrometers, and even nanometers. The other second phases-reinforcements may be selected from the group consisting of C, SiC, $B_4C$, TiC, WC, $Al_2O_3$, etc. The other second phases can take various shapes such as particulates and fibers, and various sizes from nanometers, micrometers, to millimeters. The magnesium alloy matrix is either pure magnesium or magnesium alloys. The magnesium alloys may contain one or more alloying elements selected from the group consisting of silicon (Si), aluminum (Al), copper (Cu), zinc (Zn), manganese (Mn), lithium (Li), nickel (Ni), iron (Fe), silver (Ag), calcium (Ca), carbon (C), rare earth (RE) such as neodymium (Nd), yttrium (Y), and thorium (Th), etc.

Some embodiments of the disclosure relate to the downhole tool described herein including one or more degradable/dissolvable components comprised of inorganic hydrolysable compound-containing ceramic-based materials. The ceramic-based materials comprise inorganic hydrolysable compound phase and ceramic matrix. The ceramic-based materials comprise no more than 50 wt. % of the inorganic hydrolysable compound phase. Furthermore, the ceramic-based materials may comprise other second phases, i.e., reinforcements, besides inorganic hydrolysable compound phase and ceramic matrix. According to the contents of the inorganic hydrolysable compounds and the other second phases, the ceramic-based materials can be further divided into ceramics and ceramic matrix composites. For the materials comprising at least 5 wt. % of the inorganic hydrolysable compound phase and the other second phases, they can be referred to as inorganic hydrolysable compound-containing ceramic matrix composites. For the materials comprising no more than 5 wt. % of the inorganic hydrolysable compound phase and the other second phases, they can be referred to as inorganic hydrolysable compound-containing ceramics.

Some embodiments of the disclosure relate to the downhole tool described herein including one or more degradable/dissolvable components comprised of inorganic hydrolysable compound-containing ceramic matrix composites. The composites comprise inorganic hydrolysable compounds and ceramic matrix. Optionally, the composites comprise other second phases-reinforcements. The composites comprise at least 5 wt. % of the inorganic hydrolysable compounds and the other second phases. The inorganic hydrolysable compounds have various shapes and sizes such as spherical, blocky, platelet-like, needlelike, etc., and in millimeters, micrometers, and even nanometers. The other second phases may be selected from the group consisting of carbon (C), silicon carbide (SiC), alumina ($Al_2O_3$), mulits ($Al_2O_3$—$SiO_2$), etc. The ceramic matrix is selected from the group consisting of carbides, nitrides, borides, silicides, oxides, and any combination thereof. The carbides include, but are not limited to, silicon carbide (SiC), titanium carbide (TiC), zirconium carbide (ZrC), and tungsten carbide (WC). The nitrides include, but are not limited to, titanium nitride (TiN), and chromium nitride (CrN). The borides include, but are not limited to, titanium boride ($TiB_2$), chromium boride (CrB), and zirconium boride ($ZrB_2$). The oxides include, but are not limited to, aluminum oxide ($Al_2O_3$), silicon oxide ($SiO_2$), and zirconium oxide ($ZrO_2$). Furthermore, the composites may comprise binder materials. The binder materials are selected from the group consisting of metals, alloys, polymers, carbon, and their composites.

Some embodiments of the disclosure relate to the downhole tool described herein including one or more degradable/dissolvable components comprised of inorganic hydrolysable compound-containing ceramics. The ceramics comprise inorganic hydrolysable compounds and ceramic matrix. Optionally, the composites comprise other second phases-reinforcements. The composites comprise no more than 5 wt. % of the inorganic hydrolysable compounds and the other second phases. The inorganic hydrolysable compounds have various shapes and sizes such as spherical, blocky, platelet-like, needle-like, etc., and in millimeters, micrometers, and even nanometers. The other second phases may be selected from the group consisting of carbon (C), silicon carbide (SiC), alumina ($Al_2O_3$), mulits ($Al_2O_3$—$SiO_2$), etc. The ceramic matrix is selected from the group consisting of carbides, nitrides, borides, silicides, oxides, and any combination thereof. The carbides include, but are not limited to, silicon carbide (SiC), titanium carbide (TiC), zirconium carbide (ZrC), and tungsten carbide (WC). The nitrides include, but are not limited to, titanium nitride (TiN), and chromium nitride (CrN). The borides include, but are not limited to, titanium boride ($TiB_2$), chromium boride (CrB), and zirconium boride ($ZrB_2$). The oxides include, but are not limited to, aluminum oxide ($Al_2O_3$), silicon oxide ($SiO_2$), and zirconium oxide ($ZrO_2$). Furthermore, the ceramics may comprise binder materials. The binder materials are selected from the group consisting of metals, alloys, polymers, carbon, and their composites.

Some embodiments of the disclosure relate to the downhole tool described herein including one or more degradable/dissolvable components comprised of inorganic hydrolysable compound-containing polymer-based materials. The polymer-based materials comprise inorganic hydrolysable compound phase and polymer matrix. The polymer-based materials comprise no more than 50 wt. % of the inorganic hydrolysable compound phase. Furthermore, the polymer-based materials may comprise other second phases, i.e., reinforcements (fillers), besides inorganic hydrolysable compound phase and polymer matrix. According to the contents of the inorganic hydrolysable compounds and the other second phases, the polymer-based materials can be further divided into polymers and polymer matrix composites. For the materials comprising at least 5 wt. % of the inorganic hydrolysable compound phase and the other second phases, they can be referred to as inorganic hydrolysable compound-containing polymer matrix composites. For the materials comprising no more than 5 wt. % of the inorganic hydrolysable compound phase and the other second phases, they can be referred to as inorganic hydrolysable compound-containing polymers.

Some embodiments of the disclosure relate to the downhole tool described herein including one or more degradable/dissolvable components comprised of inorganic hydrolysable compound-containing polymer matrix composites. The composites comprise inorganic hydrolysable compounds and polymer matrix. Optionally, the composites comprise other second phases-reinforcements. The composites comprise at least 5 wt. % of the inorganic hydrolysable compounds and the other second phases. The inorganic hydrolysable compounds have various shapes and sizes such as spherical, blocky, platelet-like, needle-like, etc., and in millimeters, micrometers, and even nanometers. The other second phases may be carbon or glass fibers, etc. The polymer matrix is selected from the group consisting of thermoset plastics, thermoplastic polymers, elastomers including rubber, and any combination thereof. The thermoset polymers include, but are not limited to, polyester resin, duroplast, epoxy resin, silicone resin, polyurea/polyurethane, and phenolic resin. The thermoplastic polymers include, but are not limited to, polylactic acid, polycarbonate, polyether sulfone, polyoxymethylene, polyetheretherketone, and polyetherimide. The elastomers include, but are not limited to, natural rubber, silicone elastomer, fluoroelastomer, polyurethane elastomer, nitrile rubber, and polyisoprene.

Some embodiments of the disclosure relate to the downhole tool described herein including one or more degradable/dissolvable components comprised of inorganic hydrolysable compound-containing polymers. The inorganic hydrolysable compound-containing polymers comprise dispersive inorganic hydrolysable compounds and polymer matrix. Optionally, the composites comprise other second phases-reinforcements (fillers). The polymers comprise no more than 5 wt. % of the inorganic hydrolysable compounds and the other second phases. The inorganic hydrolysable compounds have various shapes and sizes such as spherical, blocky, platelet-like, needle-like, etc., and in millimeters, micrometers, and even nanometers. The other second phases may be carbon or glass fibers, etc. The polymers are selected from the group consisting of thermoset plastics, thermoplastic polymers, elastomers including rubber, and any combination thereof. The thermoset polymers include, but are not limited to, polyester resin, duroplast, epoxy resin, silicone resin, polyurea/polyurethane, and phenolic resin. The thermoplastic polymers include, but are not limited to, polylactic acid, polycarbonate, polyether sulfone, polyoxymethylene, polyetheretherketone, and polyetherimide. The elastomers include, but are not limited to, natural rubber, silicone elastomer, fluoroelastomer, polyurethane elastomer, nitrile rubber, and polyisoprene.

Some embodiments of the disclosure relate to the downhole tool described herein including one or more degradable/dissolvable components comprised of inorganic hydrolysable compound-containing carbon-based materials. The materials comprise inorganic hydrolysable compounds and carbon matrix. The carbon-based materials comprise no more than 50 wt. % of the inorganic hydrolysable compounds. The inorganic hydrolysable compounds have various shapes and sizes such as spherical, blocky, platelet-like, needle-like, etc., and in millimeters, micrometers, and even nanometers. The carbon matrix is selected from the group consisting of carbon and its composites. The carbon is selected from the group consisting of expanded graphite, expandable graphite, natural graphite, synthetic graphite, and any combination thereof. The composites comprise a carbon matrix and second phases-reinforcements. The second phases are selected from the group consisting of metals/ alloys, carbon, ceramics, or any combination thereof. The metals/alloys are selected from the group consisting of copper (Cu), aluminum (Al), zinc (Zn), titanium (Ti), zirconium (Zr), tungsten (W), nickel (Ni), cobalt (Co), silicon (Si), chromium (Cr), iron (Fe), and their alloys. The ceramics are selected from the group consisting of silicon carbide (SiC), silicon nitride ($Si_3N_4$), silicon oxide ($SiO_2$), boron nitride (BN), and any combination thereof. The carbon is selected from the group consisting of amorphous carbon, natural graphite, carbon fiber, and any combination thereof.

Some embodiments of the disclosure relate to the downhole tool described herein including one or more degradable/dissolvable components comprised of inorganic hydrolysable compound-based material. The inorganic hydrolysable compound-based material comprises at least 50 wt. % of inorganic hydrolysable compounds. The inorganic hydrolysable compounds have various shapes and sizes such as spherical, blocky, platelet-like, needle-like, etc., and in millimeters, micrometers, and even nanometers. The inorganic hydrolysable compound-based materials may have the inorganic hydrolysable compounds as the exclusive constituents. Optionally, the inorganic hydrolysable compound-based materials may comprise other constituents besides the inorganic hydrolysable compounds. The other constituents are selected from the group consisting of metals, alloys, ceramics, polymers, carbon, and their composites. The metals and alloys are selected from the group consisting of aluminum (Al), magnesium (Mg), zinc (Zn), copper (Cu), titanium (Ti), zirconium (Zr), nickel (Ni), cobalt (Co), iron (Fe), and their alloys. The ceramics are selected from the group consisting of carbides, nitrides, borides, silicides, oxides, and any combination thereof. The polymers are selected from the group consisting of thermoset plastics, thermoplastic polymers, elastomers including rubbers, and any combination thereof.

Some embodiments of the disclosure relate to the downhole tools described herein including one or more degradable/dissolvable components comprised of gradient-distributed inorganic hydrolysable compound-containing materials. The materials comprise inorganic hydrolysable compounds and a matrix. The inorganic hydrolysable compounds have a gradient distribution, including a layered distribution, in the matrix. That is, the content of the inorganic hydrolysable compounds changes continuously or discontinuously (in a layered distribution) from the exterior surface to the core of a component. For example, the content of the inorganic hydrolysable compounds increases from surface to core of the component, or vice versa, so that a designed degradation/dissolution rate can be achieved. The inorganic hydrolysable compounds have various shapes and sizes such as spherical, blocky, platelet-like, needle-like, etc., and in millimeters, micrometers, and even nanometers. The matrix is selected from the group consisting of metals, alloys, ceramics, polymers, carbon, and their composites. Furthermore, the matrix may comprise other constituents besides the inorganic hydrolysable compounds and the matrix.

Embodiments of the disclosure relate to fabrication methods of inorganic hydrolysable compound-containing materials. The fabrication methods are selected from the group consisting of ball milling, powder metallurgy, sintering, mixing, infiltration, melting, casting, deposition, heat treatment, wrought processing, and any combination thereof. In these fabrication methods, inorganic hydrolysable compounds form either ex-situ, in-situ, or in their combination. The ex-situ formation is that inorganic hydrolysable compounds act as one of starting materials and are dispersed into a matrix and/or bonded by the matrix or a binder material. The in-situ formation is that inorganic hydrolysable compounds form via a chemical reaction in a matrix during fabrication. For example, the chemical reaction of $Al_4C_3$ phase formation is between aluminum (Al) and carbon (C), or between aluminum (Al) and silicon carbide (SiC) in an aluminum melt or an aluminum matrix during melting, casting, or heat treatment.

Embodiments of the disclosure relate to fabrication methods of inorganic hydrolysable compound-containing materials. Ball milling is used to synthesize inorganic hydrolysable compound-containing materials. The inorganic hydrolysable compounds are formed in-situ during ball milling via a chemical reaction between pure elements or compounds. Alternatively, the inorganic hydrolysable compounds are added as a starting material. Ball milling mixes the inorganic hydrolysable compounds with other constituents. Furthermore, the ball milling may refine the sizes of the constituents.

Embodiments of the disclosure relate to fabrication methods of inorganic hydrolysable compound-containing materials. Powder metallurgy is used to synthesize inorganic hydrolysable compound-containing materials. It includes mechanically mixing starting powder materials, forming a preform compact, and sintering it at elevated temperatures. Ball milling may be used to mix the starting powder materials.

Embodiments of the disclosure relate to fabrication methods of inorganic hydrolysable compound-containing materials. Sintering is used to consolidate inorganic hydrolysable compound-containing materials. After mixing starting powder materials including ball milling, a preform of mixed powders is shaped by pressing. The preform is further subjected to sintering at elevated temperatures to form a dense component. Sintering may be performed in solid or liquid phase. During sintering, inorganic hydrolysable compounds in the materials may be formed or modified.

Embodiments of the disclosure relate to fabrication methods of inorganic hydrolysable compound-containing materials. Mixing is used to synthesize inorganic hydrolysable compound-containing polymer materials. It includes mixing starting materials in which polymer is in a form of either powder or liquid, forming a preform, and curing it at room temperature or elevated temperatures.

Embodiments of the disclosure relate to fabrication methods of inorganic hydrolysable compound-containing materials. Infiltration is used to synthesize inorganic hydrolysable compound-containing materials. It includes infiltrating an inorganic hydrolysable compound-containing preform with a binder material at elevated temperatures. The binder material is selected from the group consisting of metals, alloys, polymers, and their composites.

Embodiments of the disclosure relate to fabrication methods of inorganic hydrolysable compound-containing materials. Melting method is used to synthesize inorganic hydrolysable compound-containing materials. The inorganic hydrolysable compounds are added as a starting material into a molten melt, stirred to make their uniformity, and then, the melt is poured/cast into a casting mold. Alternatively, the inorganic hydrolysable compounds may form in-situ and disperse during melting. The melt materials are either metals, alloys, polymers, or their composites.

Embodiments of the disclosure relate to fabrication methods of inorganic hydrolysable compound-containing materials. Casting method is used to shape inorganic hydrolysable compound-containing materials and is related to the melting method. After melting, a molten melt is poured/cast into a casting mold. It includes various casting methods such as die casting, press casting, etc.

Embodiments of the disclosure relate to fabrication methods of inorganic hydrolysable compound-containing materials. Deposition method is used to synthesize inorganic hydrolysable compound-containing materials, which includes 3D printing. It includes spray fusion (Oxy acetylene flame), laser deposition, plasma transferred arc melting, and electron beam melting. Inorganic hydrolysable compound powder and binder materials are taken as starting materials. During the processes, the inorganic hydrolysable compounds are bonded together by the binder materials. A component comprised of the inorganic hydrolysable compound-containing materials is built up layer by layer.

Embodiments of the disclosure relate to fabrication methods of inorganic hydrolysable compound-containing materials. Heat treatment method is used to synthesize in-situ inorganic hydrolysable compound-containing materials. During heat treatment, a chemical reaction between pure elements or compounds occurs forming inorganic hydrolysable compounds. For example, a chemical reaction for forming $Al_4C_3$ phase is between aluminum (Al) and carbon (C) in an aluminum/carbon composite, between aluminum (Al) and silicon carbide (SiC) in an aluminum/SiC composite, or between aluminum (Al) and boron carbide ($B_4C$) in an aluminum/$B_4C$ composite, etc.

Embodiments of the disclosure relate to fabrication methods of inorganic hydrolysable compound-containing materials. Heat treatment method is used to modify mechanical properties and degradability/dissolution of inorganic hydrolysable compound-containing materials. During heat treatment, there is a microstructural change in a matrix of an inorganic hydrolysable compound-containing material such as aging hardening of an aluminum alloy, with or without companying formation/modification of inorganic hydrolysable compounds.

Embodiments of the disclosure relate to fabrication methods of inorganic hydrolysable compound-containing materials. Wrought processing method is used to process inorganic hydrolysable compound-containing materials further. The wrought processing may be various cold or hot workings such as forging, rolling, extrusion, etc. The wrought processing may modify and refine the inorganic hydrolysable compounds and the matrix microstructures of the materials, to optimize materials properties.

Some embodiments of the disclosure relate to the downhole tools described herein including one or more degradable/dissolvable components comprised of inorganic hydrolysable compound-containing materials with coating. The coating has a degradation/dissolution rate different from that of the inorganic hydrolysable compound-containing materials. The coating modifies a degradation/dissolution rate of the component comprised of the inorganic hydrolysable compound-containing materials, so as to meet a designed requirement. The coating is selected from the group consisting of metals, alloys, ceramics, polymers, carbon, and their composites. The coating is applied by a method selected from the group consisting of cold/thermal spray, physical vapor deposition, chemical vapor deposition, spray fusion (Oxy acetylene flame), laser deposition, plasma transferred arc deposition, electron beam deposition, plating, painting, impregnation, and any combination thereof.

Examples are provided below to illustrate the working of the embodiments, but such the examples are by no means considered restrictive.

Example 1: In-situ formation of $Al_4C_3$-containing Al-based material. Commercially pure Al, pure iron, and a cast iron with 4.0 wt. % C are taken as starting materials. They are weighed with a target composition of 50 wt. % Al, 49.5 wt. % Fe, and 0.5 wt. % C. The staring materials are melted in an electric arc furnace in vacuum. Button samples with the target composition are prepared. Metallographic observations demonstrate the formation of needle-like $Al_4C_3$ phase distributed in the Al matrix. If all the C atoms react with Al atoms and forms the $Al_4C_3$ phase, the content of the $Al_4C_3$ phase in the Al-based material is calculated to be 2 wt. %.

A button sample of the $Al_4C_3$-containing Al-based material is immersed in a beaker of fresh water at room temperature for testing its degradability/dissolution in fresh water. After 5 days of immersion, the button sample is cracked and pulverized into powder. The results show that the $Al_4C_3$-containing Al-based material is degradable/dissolvable in water at room temperature.

$Al_4C_3$-containing Al-based material suitable for dissolvable downhole tools and components for various wellbores, such as frac plugs, balls, etc.

Example 2. Ex-situ formation of $Al_4C_3$-containing polymer matrix composite.

A polyurethane casting resin, EasyFlo 60, and $Al_4C_3$ powder with a size of 15 μm (D50) are taken as starting materials. EasyFlo 60 includes liquid part A and liquid part B, 1:1 by volume, which is purchased from Brick In The Yard (BITY) (www.brickintheyard.com). EasyFlo 60 has 2-2.5 minute working time and 15-30 minute demold. Two kinds of EasyFlo 60 castings are prepared. One is EasyFlo 60 castings without any fillers, and the other is EasyFlo 60 castings with additions of the $Al_4C_3$ powder at 30 wt. % and 40 wt. %. For those without any fillers, liquid part A and liquid part B are mixed with continuous stirring for about 1 minute and poured into a mold. For those with additions of the $Al_4C_3$ powder, firstly, the $Al_4C_3$ powder and liquid part A are mixed with continuous stirring, and then, liquid part B is added with continuous stirring for about 1.5-2 minutes and poured into a mold. All the castings are cured at room temperature for 24 hours. The blank polyurethane castings (EasyFlo 60) without any fillers and the polyurethane castings (EasyFlo 60) with additions of the $Al_4C_3$, that is, $Al_4C_3$-containing polyurethane matrix composite, are synthesized.

The blank polyurethane casting and the $Al_4C_3$-containing polyurethane matrix composites are immersed in a beaker of fresh water at about 95° C. for testing its degradability/dissolution in hot water. After 6 hours of immersion, the polyurethane matrix composites with additions of 30 wt. % and 40 wt. % of the $Al_4C_3$ are cracked extensively and the blank polyurethane casting does not show any changes in appearance. The results show that the $Al_4C_3$-containing polyurethane matrix composites are degradable/dissolvable in hot water at 95° C. $Al_4C_3$-containing polymer-based materials are suitable for dissolvable downhole tools and components for intermediate- and low-temperature wellbores, such as frac plugs, seals, etc.

Generally speaking a composite material refers to a combination of two or more of constituent materials with different physical and chemical properties without any limitations to their contents. The constituents hold each other.

Using this broad definition of a composite material in this disclosure, the invented inorganic hydrolysable compound-containing materials are a solid composite material comprising an inorganic hydrolysable compound and a binder material as its constituents. The inorganic hydrolysable compound and the binder material hold each other. The binder material is selected from the group consisting of metals, alloys, ceramics, polymers, carbon and their composites, wherein their composites are metal-based, ceramic-based, polymer-based, and carbon-based composites. The composite material comprising an inorganic hydrolysable compound and a binder material includes all the invented inorganic hydrolysable compound-containing materials such as metal-based, polymer-based, ceramic-based, carbon-based, inorganic hydrolysable compound-based materials, and their composites, which are described throughout the whole disclosure.

A dissolvable component made of a solid composite material comprising an inorganic hydrolysable compound and a binder material as its constituents disintegrates/degrades in aqueous environment such as water, water-containing solutions, or even moist air. Such the disintegration/degradation occurs starting from its exterior surface toward its interior via a hydrolysis reaction between the inorganic hydrolysable compound and water from the environment.

Figure 3:
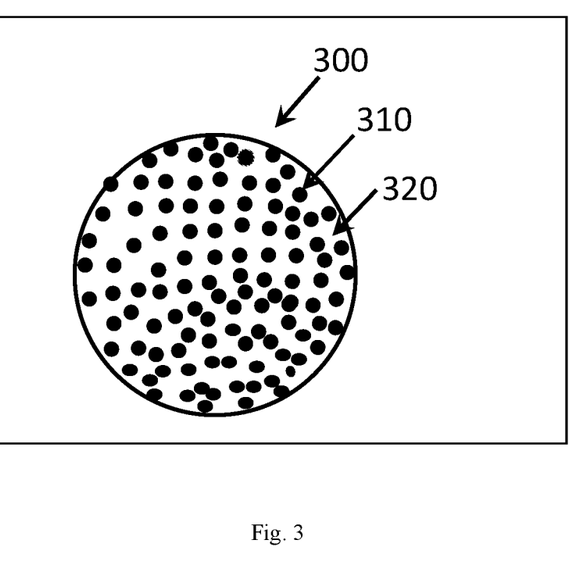
FIG. 3 is a schematic illustration of a cross section microstructure of dissolvable component comprised of an inorganic hydrolysable compound-containing material i.e. a composite material composed of an inorganic hydrolysable compound and a binder material as its constituents in which they hold each other.

FIG. 3 schematically illustrates a microstructure of a dissolvable component 300 made of an inorganic hydrolysable compound-containing material, i.e., a composite material comprising an inorganic hydrolysable compound particles 310 and a binder material 320 as its constituents. The inorganic hydrolysable compound particles 310 disperses in the binder material 320. The inorganic hydrolysable compound particles 310 and the binder material 320 hold each other.

Advantageously, embodiments of the present disclosure provide a component of a downhole tool comprised of inorganic hydrolysable compound-containing materials with improved combination of light weight, degradability/dissolvability, manufacturability, and adaptability. The constituents and microstructures of the inorganic hydrolysable compound-containing materials can be tailored in a wide range, to meet overall property needs for a degradable/dissolvable downhole tool and component. Most importantly, their degradability/dissolution is highly dependent on temperature and insensitive to chemistry of aqueous solutions, which would benefit their downhole operations due to complexity of a wellbore solution. They would improve the efficiency and performance of downhole operations in oil & gas exploration and production. Undoubtedly, their application may include any articles which require such combination, or at least the degradability/dissolution in water, water-containing solutions, and even moist air.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention as claimed.

The invention claimed is:

1. A downhole tool comprising at least one component made of an inorganic hydrolysable compound-containing material comprising an inorganic hydrolysable compound and a binder material as its constituents,
wherein the inorganic hydrolysable compound disperses in the binder material;
wherein the inorganic hydrolysable compound is selected from the group consisting of aluminum carbide ($Al_4C_3$), aluminum nitride (AlN), magnesium carbide ($Mg_2C_3$ or $MgCl_2$), manganese carbide ($Mn_3C$), calcium nitride ($Ca_3N_2$), magnesium nitride ($Mg_3N_2$), aluminum sulfide ($Al_2S_3$), aluminum magnesium carbide ($Al_2MgCl_2$), aluminum zinc carbide ($Al_4Zn_2C_3$), and any combination thereof;
wherein the binder material is selected from the group consisting of metals, alloys, ceramics, polymers, carbon, and their composites, wherein their composites are metal-based, ceramic-based, polymer-based, and carbon-based composites; and
wherein the inorganic hydrolysable compound-containing material disintegrates/degrades in an aqueous environment by a hydrolysis reaction between the inorganic hydrolysable compound and water from the environment.

2. The downhole tool of claim 1, wherein the downhole tool is selected from the group consisting of a wellbore isolation device, a perforation tool, a cementing tool, a completion tool, a drilling tool, a testing tool, a slickline tool, a wireline tool, an autonomous tool, a tubing conveyed perforating tool, and any combination thereof.

3. The downhole tool of claim 1, wherein the component is selected from the group consisting of a mandrel of a packer or plug, a spacer ring, a slip, a wedge, a retaining ring, an extrusion limiter or backup shoe, a mule shoe, a ball, a ball seat, a flapper, a sleeve, a perforation gun housing, a cement dart, a wiper dart, a sealing element, a slip block, a logging tool, a housing, a release mechanism, a pumpdown tool, an inflow control device plug, an autonomous inflow control device plug, a coupling, a connector, a support, an enclosure, a cage, a slip body, a tapered shoe, a temporary blocking plug which is used in an operation of a fracture, or a perforation, or in a wellbore for well treatment, and any combination thereof.

4. The downhole tool of claim 1, wherein the binder material is a metal or alloy selected from the group consisting of aluminum, magnesium, zinc, copper, titanium, zirconium, nickel, cobalt, iron, and their alloys, and their composites.

5. The downhole tool of claim 1, wherein the binder material is a polymer material selected from the group consisting of thermoset plastics, thermoplastic polymers, elastomers including rubbers, and any combination thereof.

6. The downhole tool of claim 1, wherein the binder material is a ceramic material selected from the group consisting of carbides, nitrides, borides, oxides, silicides, and any combination thereof.

7. The downhole tool of claim 1, wherein the binder material is a carbon material selected from the group consisting of carbon and its composites;
wherein the composites comprise a carbon matrix and reinforcements; and
wherein the reinforcements are selected from the group consisting of metals, alloys, carbon, and ceramics.

8. The downhole tool of claim 1, wherein the inorganic hydrolysable compound-containing material is a gradient-distributed inorganic hydrolysable compound-containing material comprising an inorganic hydrolysable compound phase and a binder material;
wherein the inorganic hydrolysable compound phase has a gradient distribution or a layered distribution within the matrix; and
wherein the binder material is selected from the group consisting of metals, alloys, ceramics, polymers, carbon, and their composites.

9. The downhole tool of claim 1, wherein a fabrication method of the inorganic hydrolysable compound-containing material is selected from the group consisting of ball milling, powder metallurgy, sintering, mixing, infiltration, melting, casting, deposition, molding, heat treatment, wrought processing, and any combination thereof; and wherein inorganic hydrolysable compound phase in the material either is added ex-situ, synthesized in-situ, or formed in any combination thereof.

10. The downhole tool of claim 1, wherein the component made of the inorganic hydrolysable compound-containing material comprises a coating at least partially covering its exterior surface;

wherein the coating is made of a material selected from the group consisting of metals, alloys, ceramics, polymers, carbon, and their composites; and wherein the coating is formed by a method selected from the group consisting of physical vapor deposition, chemical vapor deposition, spray including cold and thermal spray, spray fusion, laser deposition, plasma transferred arc deposition, electron beam deposition, plating, painting, impregnation, and any combination thereof.

11. A method comprising: introducing a downhole tool into a subterranean formation, wherein the downhole tool comprises at least one component made of an inorganic hydrolysable compound-containing material comprising an inorganic hydrolysable compound and a binder material as its constituents;

wherein the inorganic hydrolysable compound disperses in the binder material;

wherein the inorganic hydrolysable compound is selected from the group consisting of aluminum carbide ($Al_4C_3$), aluminum nitride (AlN), magnesium carbide ($Mg_2C_3$ or $MgC_2$), manganese carbide ($Mn_3C$), calcium nitride ($Ca_3N_2$), magnesium nitride ($Mg_3N_2$), aluminum sulfide ($Al_2S_3$), aluminum magnesium carbide ($Al_2MgC_2$), aluminum zinc carbide ($Al_4Zn_2C_3$), and any combination thereof;

wherein the binder material is selected from the group consisting of metals, alloys, ceramics, polymers, carbon, and their composites, wherein their composites are metal-based, ceramic-based, polymer-based, and carbon-based composites; and wherein the inorganic hydrolysable compound-containing material disintegrates/degrades in an aqueous environment by a hydrolysis reaction between the inorganic hydrolysable compound and water from the environment.

12. The method of claim 11, wherein the downhole tool is selected from the group consisting of a wellbore isolation device, a perforation tool, a cementing tool, a completion tool, a drilling tool, a testing tool, a slickline tool, a wireline tool, an autonomous tool, a tubing conveyed perforating tool, and any combination thereof.

13. The method of claim 11, wherein the component is selected from the group consisting of a mandrel of a packer or plug, a spacer ring, a slip, a wedge, a retaining ring, an extrusion limiter or backup shoe, a mule shoe, a ball, a ball seat, a flapper, a sleeve, a perforation gun housing, a cement dart, a wiper dart, a sealing element, a slip block, a logging tool, a housing, a release mechanism, a pumpdown tool, an inflow control device plug, an autonomous inflow control device plug, a coupling, a connector, a support, an enclosure, a cage, a slip body, a tapered shoe, a temporary blocking plug which is used in an operation of a fracture, or a perforation, or in a wellbore for well treatment, and any combination thereof.

14. A system comprising: a tool string connected to a derrick and extending through a surface into a wellbore in a subterranean formation; and a downhole tool connected to the tool string and placed in the wellbore, wherein the downhole tool comprises at least one component made of an inorganic hydrolysable compound-containing material comprising an inorganic hydrolysable compound and a binder material as its constituents;

wherein the inorganic hydrolysable compound disperses in the binder material;

wherein the inorganic hydrolysable compound is selected from the group consisting of aluminum carbide ($Al_4C_3$), aluminum nitride (AlN), magnesium carbide ($Mg_2C_3$ or $MgC_2$), manganese carbide ($Mn_3C$), calcium nitride ($Ca_3N_2$), magnesium nitride ($Mg_3N_2$), aluminum sulfide ($Al_2S_3$), aluminum magnesium carbide ($Al_2MgCl_2$), aluminum zinc carbide ($Al_4Zn_2C_3$), and any combination thereof;

wherein the binder material is selected from the group consisting of metals, alloys, ceramics, polymers, carbon, and their composites, wherein their composites are metal-based, ceramic-based, polymer-based, and carbon-based composites; and wherein the inorganic hydrolysable compound-containing material disintegrates/degrades in an aqueous environment by a hydrolysis reaction between the inorganic hydrolysable compound and water from the environment.

15. The system of claim 14, wherein the downhole tool is selected from the group consisting of a wellbore isolation device, a perforation tool, a cementing tool, a completion tool, a drilling tool, a testing tool, a slickline tool, a wireline tool, an autonomous tool, a tubing conveyed perforating tool, and any combination thereof.

16. The system of claim 14, wherein the component is selected from the group consisting of a mandrel of a packer or plug, a spacer ring, a slip, a wedge, a retaining ring, an extrusion limiter or backup shoe, a mule shoe, a ball, a ball seat, a flapper, a sleeve, a perforation gun housing, a cement dart, a wiper dart, a sealing element, a slip block, a logging tool, a housing, a release mechanism, a pumpdown tool, an inflow control device plug, an autonomous inflow control device plug, a coupling, a connector, a support, an enclosure, a cage, a slip body, a tapered shoe, a temporary blocking plug which is used in an operation of a fracture, a perforation, or in a wellbore for well treatment, and any combination thereof.

* * * * *